United States Patent
Cho et al.

(10) Patent No.: US 12,065,006 B2
(45) Date of Patent: Aug. 20, 2024

(54) SUSPENSION FOR VEHICLE

(71) Applicants: Hyundai Motor Company, Seoul (KR); Kia Corporation, Seoul (KR)

(72) Inventors: Jae Hyun Cho, Incheon (KR); Sang Hoon Yoo, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 367 days.

(21) Appl. No.: 17/533,740

(22) Filed: Nov. 23, 2021

(65) Prior Publication Data
US 2022/0288988 A1    Sep. 15, 2022

(30) Foreign Application Priority Data
Mar. 11, 2021  (KR) .................. 10-2021-0032255

(51) Int. Cl.
*B60G 11/16*  (2006.01)
*B60G 7/00*   (2006.01)
*B60G 11/15*  (2006.01)

(52) U.S. Cl.
CPC .............. *B60G 11/16* (2013.01); *B60G 7/001* (2013.01); *B60G 11/15* (2013.01); *B60G 2204/419* (2013.01); *B60G 2204/43* (2013.01)

(58) Field of Classification Search
CPC .......... B60G 11/16; B60G 7/001; B60G 7/02; B60G 11/15; B60G 2204/419; B60G 2204/43; B60G 7/006; B60G 11/36; B60G 2202/11; B60G 2204/121
See application file for complete search history.

(56) References Cited

U.S. PATENT DOCUMENTS

| 2,741,475 A | 4/1956 | Roebrig | |
| 8,573,618 B2 * | 11/2013 | Schroder | B60G 11/08 280/124.135 |
| 2014/0291951 A1 * | 10/2014 | Zandbergen | B60G 7/008 280/79 |
| 2022/0288986 A1 * | 9/2022 | Yoo | B60G 7/001 |

FOREIGN PATENT DOCUMENTS

| GB | 176919 A | 3/1922 |
| KR | 10-2008-0036888 A | 4/2008 |
| KR | 2008-0052760 A | 6/2008 |

OTHER PUBLICATIONS

Kr 20130047036-A to Lee (Year: 2013).*
Kr 20080029164-A to Sun (Year: 2008).*
European Search Report issued May 18, 2022 in European Patent Application No. 21210181.0.

* cited by examiner

*Primary Examiner* — Pamela Rodriguez
(74) *Attorney, Agent, or Firm* — Fox Rothschild LLP

(57) ABSTRACT

A suspension for a vehicle is configured such that, even in a situation of departing from a range (spring freedom height) in which a coil spring may be tensioned as a rebound state is added in a full rebound state, a lower end of the coil spring is coupled to a spring pad coupled to a leaf spring and continuously supported, so that the separation of the coil spring connecting a suspension arm to a body member may be prevented. The suspension includes the leaf spring provided at the suspension arm connecting a body frame to a knuckle; a spring pad coupled to the leaf spring; and the coil spring supported, at opposite ends of the coil spring, by the body member and the spring pad, the body member being located above the suspension arm.

9 Claims, 4 Drawing Sheets

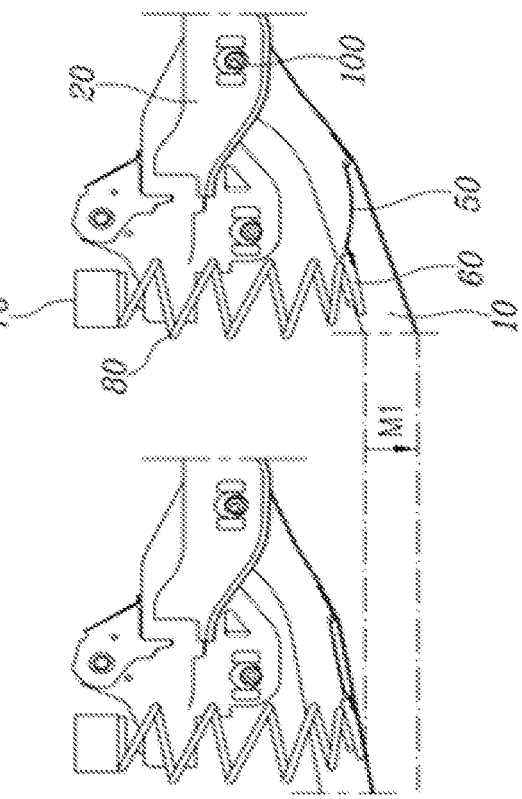
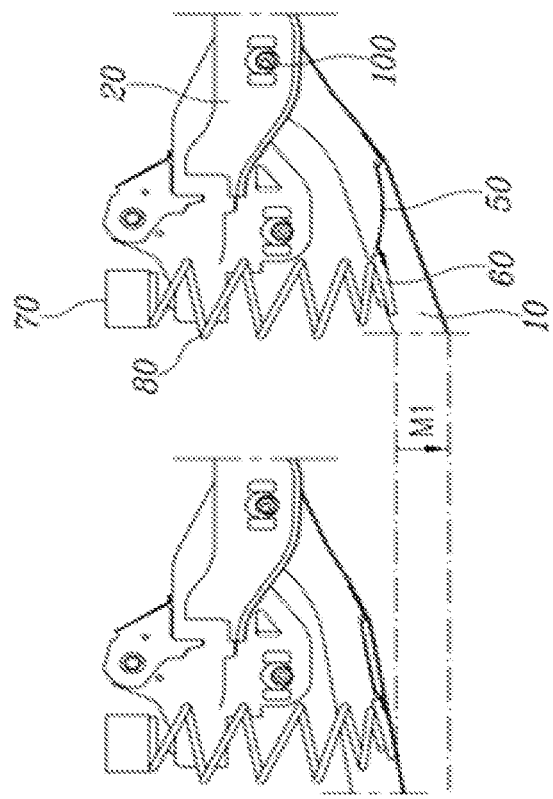
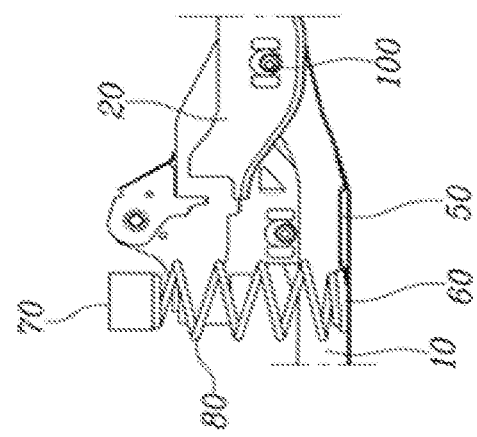

SUSPENSION FOR VEHICLE

CROSS REFERENCE TO RELATED APPLICATION

The present application claims under 35 U.S.C. § 119(a) the benefit of Korean Patent Application No. 10-2021-0032255, filed Mar. 11, 2021, the entire contents of which are incorporated by reference herein.

BACKGROUND

(a) Technical Field

The present disclosure relates generally to a suspension for a vehicle, more particularly, to the suspension having a structure capable of preventing separation of a spring (coil spring) connecting a suspension arm to a body member when a rebound state is added in a full rebound state during driving.

(b) Description of the Related Art

In a recent trend of engine or vehicle tuning, tuning a vehicle "hard" has become more desirable based on high-end European vehicles that typically have excellent handling performance, and reduction of vehicle weight has been mined out to meet the eco-friendly trend.

In order to turn a vehicle hard, wheel rate, i.e., hardness supporting a tire while applying a vertical load to the tire, should be high, and in order to increase the wheel rate, hardness of a spring connecting a suspension arm to a body member should increase.

When the vehicle weight is lightened, a force compressing the spring is reduced and thereby the amount of compression of the spring is reduced.

As described above, in a state in which the hardness of the spring increases in order to satisfy the vehicle property of being turned hard, when the vehicle weight is lightened in order to satisfy a property of the eco-friendly vehicle, the amount of compression of the spring is further reduced when the vertical load is applied to the tire. As a result, when a rebound state is added in a full rebound state during driving (state of departing from a range in which the spring may be tensioned, state of departing from freedom height of the spring, and a state in which the tire passes through a deep puddle), there is a problem that the spring connecting the suspension arm to the body member is separated, and as a result, an accident such as a vehicle rollover may occur.

In order to prevent separation of the spring, wheel stroke of the vehicle should be reduced, and the wheel stroke is a main factor affecting the vehicle performance and merchantability, but it is difficult to change the wheel stroke.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a suspension for a vehicle, the suspension being configured to prevent separation of a spring connecting a suspension arm to a body member, even in a situation of departing from a range (spring freedom height) in which the spring may be tensioned, that is, a situation in which a rebound state is added in a full rebound state during driving, so that stability of the vehicle may be improved.

In order to achieve the above objective, a suspension for a vehicle of the present disclosure includes: a leaf spring provided at a suspension arm connecting a body frame to a knuckle; a spring pad coupled to the leaf spring; and a coil spring provided to be supported, at opposite ends of the coil spring, by a body member and the spring pad, the body member being located above the suspension arm.

The leaf spring may be arranged along a longitudinal direction of the suspension arm and configured to have a shape of a cantilever such that a first end of the leaf spring may be coupled to the suspension arm and the spring pad may be securely coupled to a second end of the leaf spring, the second end of the leaf spring corresponding to a free end of the cantilever.

The leaf spring may include: a coupled portion located at a first end of the leaf spring and integrally coupled to the suspension arm; a rod portion extended from the coupled portion along a longitudinal direction of the suspension arm and configured to be elastically deformed in response to external force; and a seat portion provided at an end of the rod portion and coupled to the spring pad.

The suspension arm may include a spring inserting portion located between a first end of the suspension arm coupled to a suspension arm bush and a second end of the suspension arm coupled to the knuckle; the coupled portion of the leaf spring may be securely coupled to a portion of the suspension arm between the suspension arm bush and the spring inserting portion; and the seat portion of the leaf spring may be provided to be located at the spring inserting portion.

The spring pad may have a spring coupling groove, along an outer circumference of the spring pad, into which the coil spring may be inserted and fixed.

The spring pad may include a stopper portion provided to further protrude from a lower side of the leaf spring; and the stopper portion may be configured to be brought into contact with the suspension arm by an elastic force of the coil spring.

The spring pad may be made of a rubber material in order to achieve shock absorption and prevention of noise.

In a normal full rebound state without departing from a freedom height of the coil spring, the leaf spring may be moved downward and compressed by spring force, and a lower end of the coil spring may be coupled to and supported by the spring pad while the stopper portion of the spring pad may be in contact with the suspension arm; and when a rebound state is added in the full rebound state, compression of the leaf spring may be eliminated and the leaf spring may be elastically moved upward, and the spring pad may be continuously coupled to the lower end of the coil spring to support the coil spring, so that separation of the coil spring may be prevented.

In the suspension of the present disclosure, even in a situation of departing from a range (spring freedom height) in which the coil spring may be tensioned as a rebound state is added in a full rebound state, the lower end of the coil spring is coupled to and continuously supported by the spring pad coupled to the leaf spring, so separation of the coil spring connecting the suspension arm to the body member can be prevented. Accordingly, occurrence of an accident (e.g., a vehicle rollover) can be prevented, and with improvement of vehicle stability, improvement of merchantability can be induced.

The present disclosure is configured to prevent the separation of a rear wheel spring during the full rebound in a vehicle having a high wheel rate, such as turning where handling is a priority and a high performance vehicle, so there are advantages that round stroke can be further secured and excellent ride comport can be secured by improving shock on impact even in a high performance vehicle.

The present disclosure is configured such that the lower end of the coil spring is physically supported using the spring pad coupled to the leaf spring at a time when the vehicle reaches the full rebound state so as to prevent the separation of the coil spring. Accordingly, with the structure not affecting hardness of the coil spring during driving operation, the suspension can be used without having the sense of difference.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 5A to 5C are views showing operation states of the suspension according to the present disclosure, wherein FIG. 5A shows a tolerance state, FIG. 5B shows a full rebound state, and FIG. 5C shows a state in which a rebound state is added in the full rebound state.

DETAILED DESCRIPTION OF THE DISCLOSURE

Figure 1:
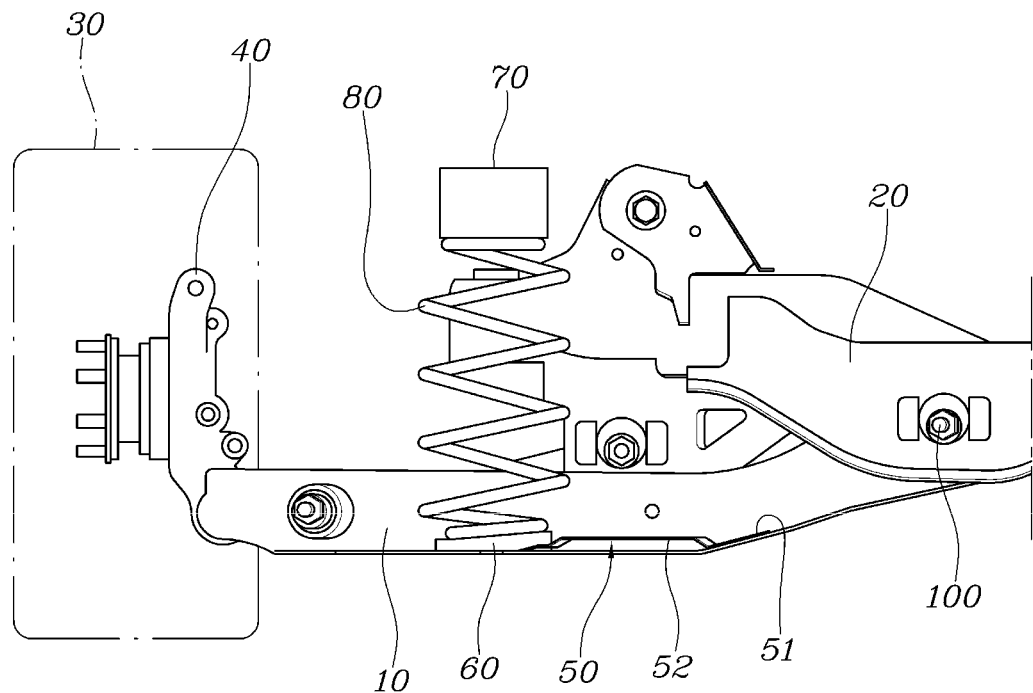
FIG. 1 is a view showing a suspension for a vehicle in which a leaf spring coupled to a spring pad is provided in a suspension arm according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiment, so it should be understood that the present disclosure may be variously embodied, without being limited to the exemplary embodiments.

An embodiment described herein may be changed in various ways and various shapes, so specific embodiments are shown in the drawings and will be described in detail in this specification. However, it should be understood that the exemplary embodiment according to the concept of the present disclosure is not limited to the embodiment which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present disclosure. Singular forms are intended to include plural forms unless the context clearly indicates otherwise.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control part (controller) according to the exemplary embodiment of the present disclosure may be realized by a nonvolatile memory (not shown), which may include an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. The processor may take one or more form.

Hereinbelow, a suspension for a vehicle according to an exemplary embodiment of the present disclosure will be described with reference to accompanying drawings.

Figure 2:
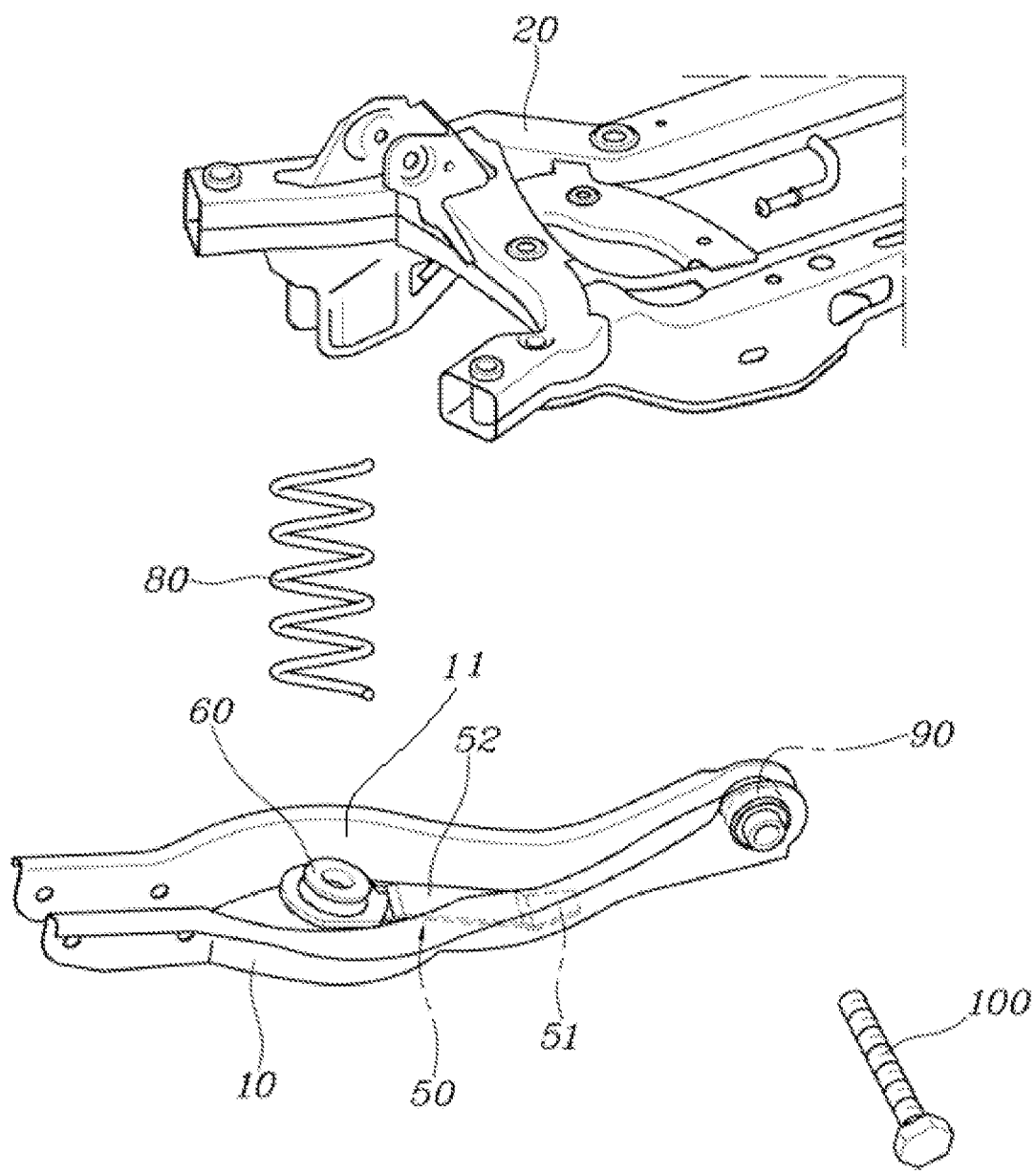
FIG. 2 is a disassembled view of FIG. 1.
Figure 3:
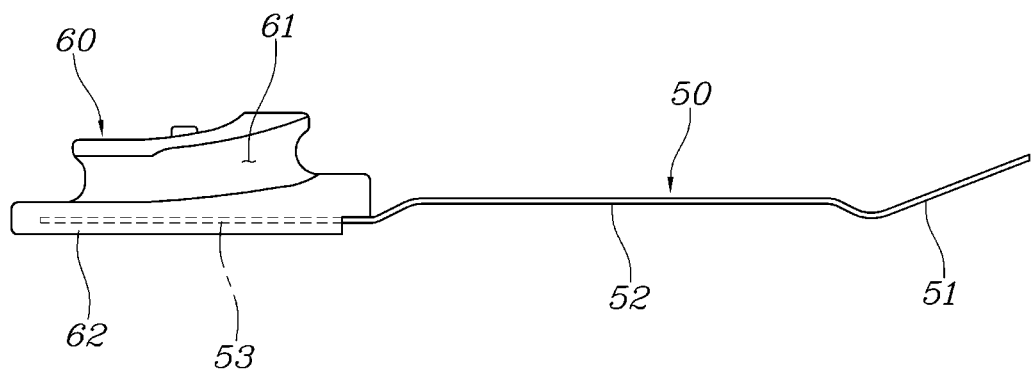
FIGS. 3 and 4 are a side view and a lower surface view of the leaf spring coupled to the spring pad according to the present disclosure.
Figure 4:
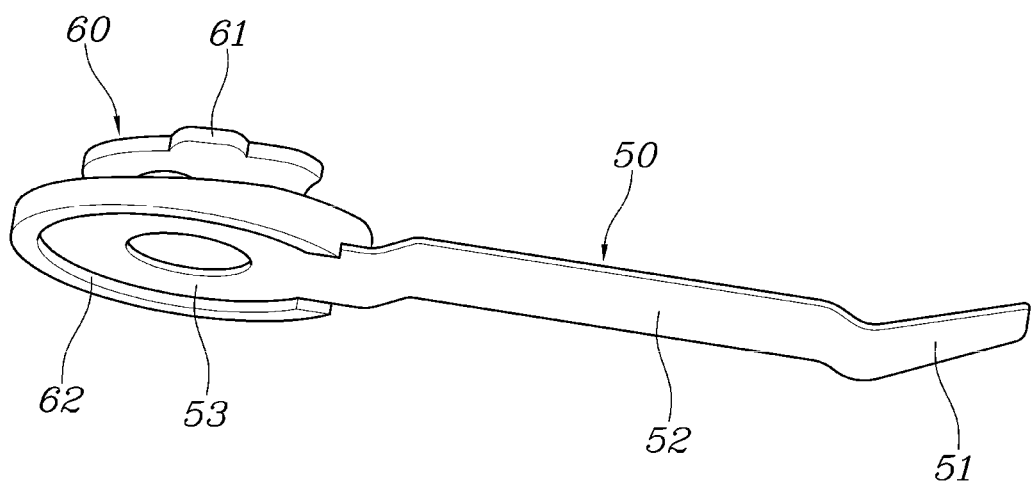

In FIGS. 1-4 and 5A-5C, an example of a multi-link type rear suspension for describing the present disclosure is shown.

According to the present disclosure, the suspension for a vehicle is configured such that a first end of a suspension arm 10 is connected to a body frame 20 and a second end of the suspension arm 10 is connected to a knuckle 40 of a tire 30.

The suspension arm 10 is a rear lower arm and the body frame 20 is a rear cross member.

The suspension of the present disclosure includes: a leaf spring 50 provided at the suspension arm 10 and connecting the body frame 20 to the knuckle 40; a spring pad 60 coupled to the leaf spring 50; a body member 70 located above the suspension arm 10; and a spring 80 provided to be supported, at opposite ends of the spring 80, by the spring pad 60.

The leaf spring 50 may be made of one of spring steel, stainless steel, or polymeric material, and be capable of tuning of elastic force in response to the sectional thickness, width, and material of the leaf spring.

The leaf spring 50 has a structure covered up by the suspension arm 10 and arranged along a longitudinal direction of the suspension arm 10.

The leaf spring 50 is configured to have a shape of a cantilever such that a first end of the leaf spring 50 is coupled to the suspension arm 10, and the spring pad 60 is securely coupled to a second end of the leaf spring 50, the second end corresponding to a free end of the cantilever.

That is, the leaf spring 50 includes a coupled portion 51 at the first end of the leaf spring 50, which is integrally coupled to the suspension arm 10, a rod portion 52 extended from the coupled portion 51 along the longitudinal direction of the suspension arm 10 and elastically deformed in response to external force, and a seat portion 53 provided at an end of the rod portion 52 and coupled to the spring pad 60.

A suspension arm bush 90 is coupled to the first end of the suspension arm 10 and a bolt 100 passes through the suspension arm bush 90 and the body frame 20 so as to be fastened to a nut, so the first end of the suspension arm 10 is coupled to the body frame 20.

The second end of the suspension arm 10 is coupled to the knuckle 40, and a spring inserting portion 11 in which the spring 80 is inserted is provided between the first end of the suspension arm 10, which is coupled to the suspension arm bush 90, and the second end of the suspension arm 10 coupled to the knuckle 40.

The coupled portion 51 of the leaf spring 50 is securely coupled to a portion between the first end of the suspension arm 10, which is coupled to the suspension arm bush 90 and the spring inserting portion 11 by welding or bolting as a medium, and the seat portion 53 of the leaf spring 50, which is coupled to the spring pad 60 and located at the spring inserting portion 11 in the suspension arm 10.

Accordingly, the embodiment of the present disclosure is configured to support the spring 80 connecting the suspension arm 10 to the body member 70 by using the leaf spring 50 having a length shorter than a length of the suspension arm 10, such that during a bump or rebound state, the leaf spring 50 may reduce generated lateral force by offsetting an angle formed by arced exercise of the suspension arm 10 acting around the bolt 100, so that separation of the spring 80 may be efficiently prevented.

The spring pad 60 according to the present disclosure includes a spring coupling groove 61 formed along an outer circumference of the spring pad 60, and the spring coupling groove 61 is provided for the spring 80 to be inserted and fixed such that a lower end of the spring 80 wraps around the spring coupling groove 61.

The spring pad 60 is preferably made of rubber or a material having elasticity in order to prevent impact generated due to a contact between steels, noise, and chipping, but the present disclosure is not limited thereto.

The spring pad 60 is securely coupled to the seat portion 53 of the leaf spring 50 and the spring pad 60 includes a stopper portion 62 provided to further protrude from a lower side of the leaf spring 50. The stopper portion 62 of the spring pad 60 is brought into contact with the suspension arm 10 by the elastic force of the spring 80, so direct contact between the steel parts (direct contact between the suspension arm and the seat portion of the leaf spring) may be prevented.

The body member 70 is a side member, an upper end of the spring 80 is supported to the body member 70 located above the suspension arm 10, and a lower end of the spring 80 is coupled to the spring pad 60 coupled to the seat portion 53 of the leaf spring 50 and is supported.

The spring 80 is a coil spring connecting body member 70 to the suspension arm 10 through the spring pad 60 and the leaf spring 50.

FIG. 5A shows a tolerance state, and FIG. 5B shows a full rebound state.

In the tolerance state or the normal full rebound state without departing from a range (spring freedom height) in which the spring 80 may be tensioned as the rod portion 52 and the seat portion 53 of the leaf spring 50 are moved downward by the spring force, the leaf spring 50 is compressed and the spring pad 60 supports the lower end of the spring 80 while the stopper portion 62 is in contact with the suspension arm 10 and the lower end of the spring 80 is coupled to the spring pad 60.

Furthermore, in a normal full bump state without departing from the range (spring freedom height) in which the spring 80 may be tensioned, the spring pad 60 also supports the lower end of the spring 80 while the lower end of the spring 80 is coupled to the spring pad 60 due to the spring force.

FIG. 5C shows an additional rebound state in which a rebound state is added in the full rebound state of FIG. 5B.

When a rebound state is added in the full rebound state of FIG. 5B, the suspension arm 10 further rotates counterclockwise on the bolt 100, so the amount of downward movement increases, as shown in the drawing (arrow M1).

However, the rod portion 52 and the seat portion 53 are elastically moved upward (direction toward body member) as the leaf spring 50 is released from the compression, and as a result, the spring pad 60 coupled to the leaf spring 50 is continuously coupled to and supports the lower end of the spring 80 and thus the spring 80 may be prevented from being separated.

As described above, the suspension according to the embodiment of the present disclosure is configured such that, the lower end of the spring 80 is continuously supported while being coupled to the spring pad 60 coupled to the leaf spring 50 even in a situation of departing from the range (spring freedom height) in which the spring 80 may be tensioned as a rebound state is added in the full rebound state. Accordingly, the separation of the spring 80 connecting the suspension arm 10 to the body member 70 is prevented, so that an accident (e.g., a vehicle rollover) may be prevented, and with improvement of vehicle stability improvement of merchantability may be improved.

The embodiment of the present disclosure is configured to prevent the separation of a rear wheel spring during the full rebound state in a vehicle having a high wheel rate, such as the turning where handling is a priority and the high performance vehicle, so rebound stroke may be additionally secured and excellent ride comfort may be secured by improving shock on impact even in the high performance vehicle.

Furthermore, the present disclosure is configured such that the lower end of the spring 80 is physically supported using the spring pad 60 coupled to the leaf spring 50 at a time when the vehicle reaches the full rebound state so as to prevent the separation of the spring 80. Accordingly, with the structure not affecting hardness of the spring during driving operation, the suspension may be applied without the sense of difference.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A suspension for a vehicle, the suspension comprising:
    a leaf spring provided at a suspension arm connecting a body frame to a knuckle;
    a spring pad coupled to the leaf spring; and
    a coil spring provided to be supported, at opposite ends of the coil spring, by a body member and the spring pad, the body member being located above the suspension arm;
    wherein the leaf spring is arranged along a longitudinal direction of the suspension arm and configured to have a shape of a cantilever such that a first end of the leaf spring is coupled to the suspension arm and the spring pad is securely coupled to a second end of the leaf spring, the second end of the leaf spring corresponding to a free end of the cantilever.

2. The suspension for a vehicle of claim 1, wherein the leaf spring comprises:
    a coupled portion located at a first end of the leaf spring and integrally coupled to the suspension arm;
    a rod portion extended from the coupled portion along a longitudinal direction of the suspension arm and configured to be elastically deformed in response to external force; and
    a seat portion provided at an end of the rod portion and coupled to the spring pad.

3. The suspension for a vehicle of claim 2, wherein the suspension arm comprises a spring inserting portion located between a first end of the suspension arm coupled to a suspension arm bush and a second end of the suspension arm coupled to the knuckle;
    the coupled portion of the leaf spring is securely coupled to a portion of the suspension arm between the suspension arm bush and the spring inserting portion; and
    the seat portion of the leaf spring is provided to be located at the spring inserting portion.

4. The suspension for a vehicle of claim 1, wherein the spring pad has a spring coupling groove, along an outer circumference of the spring pad, into which the coil spring is inserted and fixed.

5. The suspension for a vehicle of claim 1, wherein the spring pad comprises a stopper portion provided to further protrude from a lower side of the leaf spring; and
    the stopper portion is configured to be brought into contact with the suspension arm by an elastic force of the coil spring.

6. The suspension for a vehicle of claim 5, wherein in a normal full rebound state without departing from a freedom height of the coil spring, the leaf spring is moved downward and compressed by spring force, and a lower end of the coil spring is coupled to and supported by the spring pad while the stopper portion of the spring pad is in contact with the suspension arm; and
    when a rebound state is added in the full rebound state, compression of the leaf spring is eliminated and the leaf spring is elastically moved upward, and the spring pad is continuously coupled to the lower end of the coil spring to support the coil spring, so that separation of the coil spring is prevented.

7. The suspension for a vehicle of claim 1, wherein the spring pad is made of a rubber material in order to achieve shock absorption and prevention of noise.

8. A suspension for a vehicle, the suspension comprising:
    a leaf spring provided at a suspension arm connecting a body frame to a knuckle;
    a spring pad coupled to the leaf spring; and
    a coil spring provided to be supported, at opposite ends of the coil spring, by a body member and the spring pad, the body member being located above the suspension arm;
    wherein the leaf spring comprises:
        a coupled portion located at a first end of the leaf spring and integrally coupled to the suspension arm;
        a rod portion extended from the coupled portion along a longitudinal direction of the suspension arm and configured to be elastically deformed in response to external force; and
        a seat portion provided at an end of the rod portion and coupled to the spring pad.

9. A suspension for a vehicle, the suspension comprising:
    a leaf spring provided at a suspension arm connecting a body frame to a knuckle;
    a spring pad coupled to the leaf spring; and
    a coil spring provided to be supported, at opposite ends of the coil spring, by a body member and the spring pad, the body member being located above the suspension arm;
    wherein the spring pad comprises a stopper portion provided to further protrude from a lower side of the leaf spring; and
    wherein the stopper portion is configured to be brought into contact with the suspension arm by an elastic force of the coil spring.

* * * * *